Patented Aug. 8, 1939

2,168,789

UNITED STATES PATENT OFFICE 2,168,789

PROCESS OF PREPARING GLUCOSIDES HAVING AN ACTION ON THE HEART OBTAINED FROM OLEANDER LEAVES

Max Bockmühl and Gustav Ehrhart, Frankfort-on-the-Main-Hochst, Germany, assignors to Winthrop Chemical Company, Inc., New York, N. Y., a corporation of New York No Drawing. Application June 26, 1937, Serial No. 150,659. In Great Britain July 3, 1936

4 Claims. (Cl. 87—28)

The present invention relates to a process of preparing glucosides having an action on the heart obtained from oleander leaves.

Processes for the production from oleander leaves of glucosides having an action on the heart have often been described. The general procedure is as follows: The aqueous or aqueous-alcoholic extracts required for obtaining the substances having an action on the heart are purified with lead acetate and the extracts thus pretreated are further treated to obtain glucosides in a solid form. The yields greatly vary and in the most favorable case amount to 0.15 per cent of the leaves used.

In our co-pending U. S. application Serial No. 87,802, filed June 27, 1936, now Patent 2,099,158, we have described that substances having an action on the heart may be obtained from oleander leaves in a yield of about 0.5 per cent by extracting with a suitable solvent the aqueous or aqueous-alcoholic extracts obtained in known manner from the dried or fresh leaves; suitable solvents are especially chlorinated aliphatic hydrocarbons, for instance, chloroform, carbon tetrachoride or methylene chloride. From the extract in a suitable solvent the effective substances are precipitated by addition of a suitable organic liquid, particularly saturated hydrocarbons, for instance, benzine, petroleum ether, cyclohexane, methylcyclohexane, octane, nonane, decane, decahydronaphthalene. After this separation the effective substances may again be dissolved and reprecipitated; for instance, the crude product may be dissolved in benzene and separated in a purified form by the addition of one of the above named organic liquids, such as cyclohexane or benzine.

Now we have found that the products obtained according to the process described above may be separated by means of ether into glucosides readily soluble in ether and glucosides insoluble in ether both kinds of compounds having an action on the heart. The separation of the products obtainable according to the process of our co-pending U. S. application mentioned above by means of ether may also be carried out with advantage in an earlier phase of the process, for instance, the aqueous or aqueous-alcoholic extracts or the extracts thereof in chloroform, carbon tetrachloride, etc., obtained according to the process of our co-pending U. S. application may immediately be treated with ether after evaporation of the solvents.

The glucoside fractions separated by means of ether are real glucosides as they can be separated by means of acids into genines not yet defined and sugar.

The production of glucosides which have an action on the heart and are readily soluble in ether is surprising as hitherto the insolubility in ether of the heart-glucosides has always been emphasized. The following examples serve to illustrate the invention but they are not intended to limit it thereto:

(1) 20 grams of the glucoside mixture obtained as described in the example of our co-pending U. S. application Serial No. 87,802, filed June 27, 1936, are stirred for one hour with 200 cc. of ether, the undissolved portions of the mixture are separated by filtering with suction, the ether is distilled from the filtrate, the residue is dried under reduced pressure and then is again taken up in 200 cc. of ether and small portions of the undissolved substances are separated by filtration. After the distillation of the ether there remains a glucoside readily soluble in ether.

The compound has no exact melting point; it begins to sinter at 105° C. and melts between 115° C. and 120° C. The yield amounts to 2 grams.

(2) An aqueous extract of 2.8 kilograms of oleander leaves, obtained as described in our U. S. application mentioned above, is concentrated nearly to dryness, the sticky residue is treated with acetone, the undissolved substance (0.3 gram) is separated by filtering with suction, the acetone solution is dried under reduced pressure and the residue is ground several times with ether. The substance insoluble in ether is separated by filtering with suction and the ether is distilled from the clear ethereal solution. The residue is again dissolved in ether, filtered until clear and the ethereal extract is finally freed from ether under reduced pressure. 6.1 grams of the glucoside having the properties described in Example 1 are obtained.

The ethereal fraction may be obtained in the same manner from aqueous-alcoholic extracts and from chloroform extracts.

We claim:

1. The process which comprises extracting an aqueous extract of oleander leaves with a chlorinated aliphatic hydrocarbon, evaporating said solvent and extracting the residue with ether.

2. The process which comprises extracting an aqueous extract of oleander leaves with a chlorinated aliphatic hydrocarbon, precipitating the glucosides having an action on the heart dissolved therein by means of a liquid saturated hydrocarbon and extracting the precipitate with ether.

3. The process which comprises extracting an aqueous extract of oleander leaves with a chlorinated aliphatic hydrocarbon, precipitating the glucosides having an action on the heart dissolved therein by means of a liquid saturated hydrocarbon, dissolving the precipitate in a chlorinated aliphatic hydrocarbon, again precipitating the glucosides by means of a liquid saturated hydrocarbon and extracting the precipitate with ether.

4. The process which comprises extracting an aqueous extract of oleander leaves with chloroform, concentrating the chloroform-extract, precipitating the glucosides by adding petroleum ether, dissolving the precipitate in benzene, again precipitating it by adding cyclohexane to the solution and extracting the precipitate with ether.

MAX BOCKMÜHL.
GUSTAV EHRHART.